Dec. 18, 1962  M. H. GROVE  3,069,131
VALVE CONSTRUCTION
Filed Oct. 9, 1959
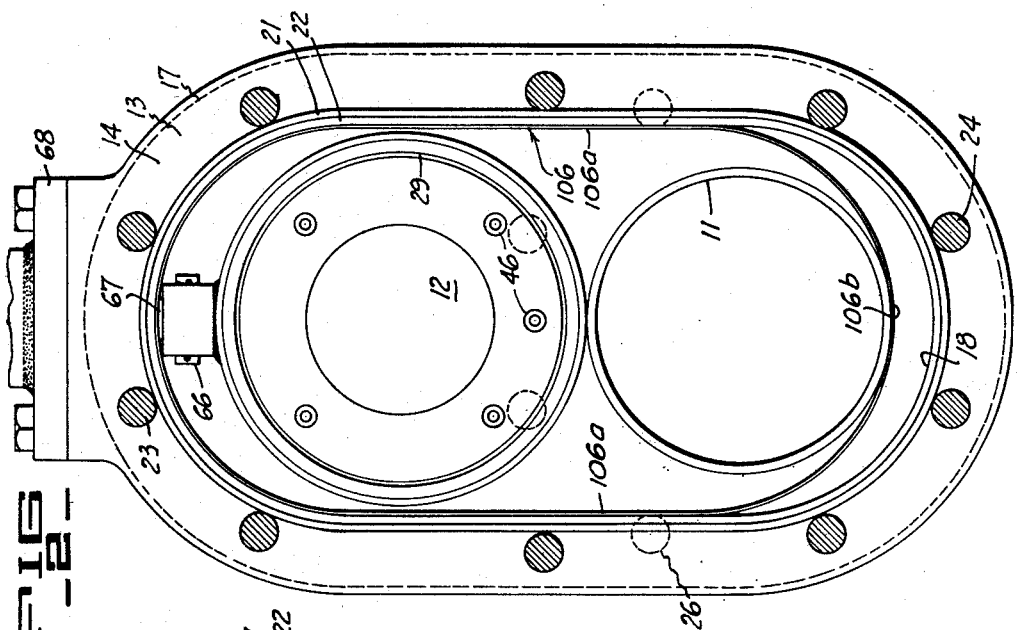
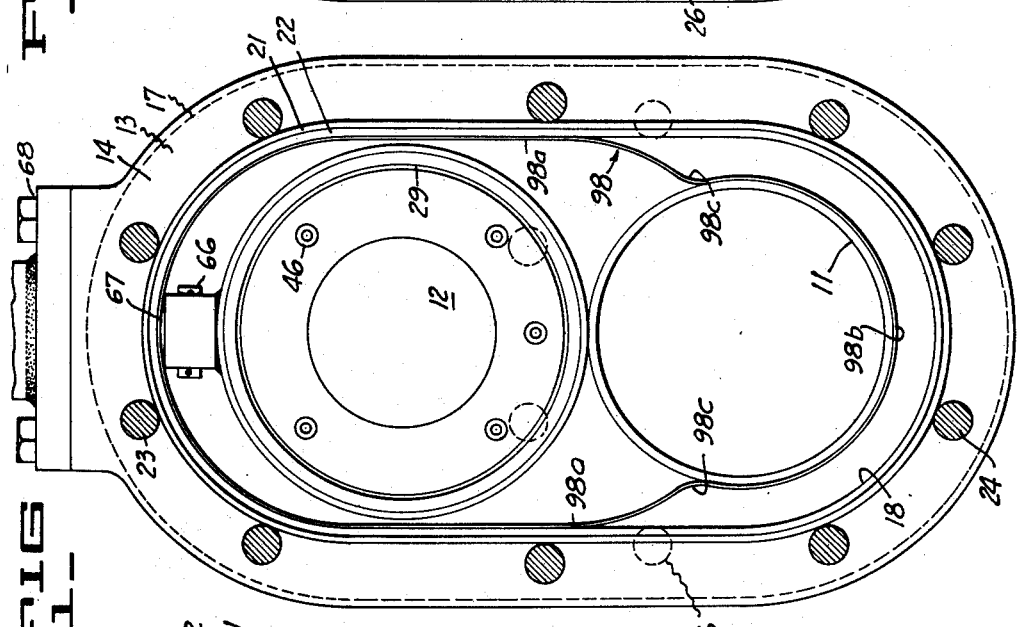
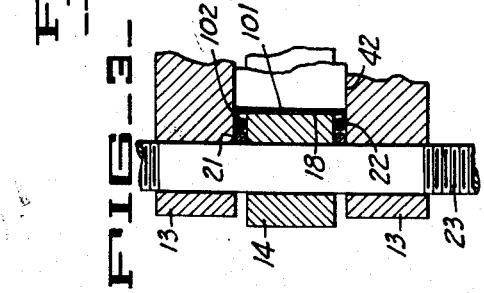
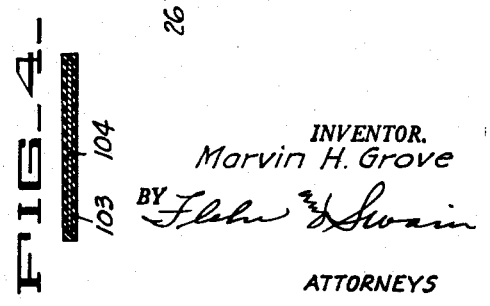
INVENTOR.
Marvin H. Grove
BY
ATTORNEYS United States Patent Office 3,069,131
Patented Dec. 18, 1962

3,069,131
VALVE CONSTRUCTION
Marvin H. Grove, 340 Hillside Ave., Piedmont, Calif.
Filed Oct. 9, 1959, Ser. No. 845,382
3 Claims. (Cl. 251—327)

This invention relates generally to valves for controling various fluids, including gases and liquids. More particularly it pertains to valves of the gate type wherein a valve gate is movable between open and closed positions relative to aligned flow passages in the body.

In place of the more conventional cast metal (e.g. cast iron or steel) the bodies of gate valves have been fabricated by welding together mill rolled structural forms, such as steel plate, channels and the like. Such fabricated bodies have proven economical and advantageous for gate valves of the larger sizes. Instead of fabricating by welding, it is possible to use plate-like body parts that are bolted together, with suitable sealing means between the parts to prevent leakage.

Assuming that a gate valve is constructed with a body space or cavity having flat parallel side defining surfaces, together with a flat-plate-like gate, which has a thickness comparable to the spacing between such side surfaces, then the valve may be susceptible to entrance of sufficient material into the body space to interfere with movement of the gate between its full open and closed positions.

An object of the present invention is to provide novel guard means serving to minimize entrance of foreign material into the body cavity.

Additional objects and features of the invention will appear from the following description in which the preferred embodiment of the invention has been described in conjunction with the accompanying drawing.

Referring to the drawing:

FIG. 1 is a view showing an embodiment incorporating special guard means in the body space of a valve;

FIG. 2 is a view showing another embodiment of the guard means;

FIG. 3 is a detail in section on an enlarged scale of a portion of the structure of FIG. 1;

FIG. 4 is a detail in section showing another embodiment of the guard means.

The particular valve construction shown in FIGURES 1 and 2 consists generally of a body provided with flow passages 11 for connection with associated piping. The valve member 12 is in the form of a flat plate that is movable between open and closed positions with respect to the flow passages. The body is formed from the three plate-like parts 13 and 14, the parts 13 forming the side walls. Each of these parts can be made of mill rolled steel or like rigid plate materials, which may be cut to the configuration desired by suitable means such as an acetylene cutting torch. Each body part 13 is cut to the outer contour line 17, and an opening is cut to provide the passage 11. Body part 14 similarly can be cut out from a larger metal plate, both with respect to its outer contour, and also with respect to its inner contour 18.

Means is provided for forming seals between the body parts. Thus retainer wires 21, formed of relatively hard metal or metal alloy, are interposed between each side face of the intermediate body part 14 and the adjacent side faces of the body part 13. Each wire retainer is made from a length of suitable wire having its ends butt welded or otherwise securely attached together. The resulting endless wire loop is sprung to conform generally to the shaping of the inner surface 18 of the body part 14. A seal ring 22 of the resilient O-ring type is positioned immediately adjacent the inner periphery of the wire retainer 21. The body parts are securely clamped together by the bolts 23 together with stud bolts 24. Thus the retainer wires 21 are securely clamped between the body parts, and are securely held against displacement, thereby forming a fixed shoulder for taking the thrust of fluid pressure acting upon the seal ring 22. Assuming that each wire retainer 21 is made of a material somewhat harder than the material from which the body parts are made, then the application of clamping forces may serve to cause a small amount of indentation of the wire into the adjacent surfaces of the body parts, thereby aiding retention against displacement.

As illustrated in FIGURE 3, wire retainers 21 are dimensioned whereby when applied during assembly, they contact the inner sides of the bolts 23 and 24. This is to facilitate assembly by locating the wire retainers, and in addition may aid in the support of the wire retainer during normal use of the valve.

In addition to the stud bolts 24, which are distributed to engage holes in the coupling flanges, threaded studs 26 are provided for the same purposes.

FIGS. 1 and 2, show resilient sealing means between the gate and the body for sealing both sides of the gate. The sealing means illustrated in this instance consists of seal ring 29 of resilient material, such as synthetic rubber like Hycar or neoprene, or elastic material like Teflon, Kel-F, or nylon.

As is understood by those by those familiar with gate valves, various types of operating means can be used for moving the gate between full open and closed positions. As illustrated in FIGURE 2, the gate can be of circular configuration, and can be loosely attached by pin 66 to the operating stem 67. This stem is shown extending through the bonnet 68. The exterior end of the stem is attached to suitable operating means, such as means of the manually operated hand wheel type, or motive means such as a fluid pressure operated diaphragm or piston, or an electric motor.

With valves of the type described above, the body space for accommodating the gate is relatively small. Therefore the valve may be susceptible to accumulation of foreign material such as may interfere with proper movement of the gate between its limiting positions. In the embodiment shown in FIGURES 1–4, guard means is provided which protects the lower part of the body space from receiving foreign material when the valve gate is in its fully raised or open position. The guard means in this instance consists of a strip or band 98 made in the form of an endless loop, and having a width comparable to the width of the body space. It can be formed of suitable spring metal, such as one of the stainless steels, Monel metal, bronze or the like. It is inserted into the body cavity during assembly, whereby for open position of the gate, it occupies the position shown in FIGURE 1. The relaxed form of the loop may be such that it is sprung by pressing together the side portions 98a, to place it into the body space. The portion 98b is formed whereby for open position of the gate, and with the band within the cavity, this portion 98b conforms generally to the periphery of the flow passages 11, over an angular distance somewhat greater than 180°. Between the band portions 98a and 98b, are the formed or bent portions 98c. Some frictional engagement of the band portions 98a with the defining surfaces of the body space, is sufficient to hold the band in raised position, although for full open position of the gate shown in FIGURE 1, the gate itself holds the band raised. When the gate is moved toward closed position, band 98 remains stationary for the initial part of such gate movement, but after the gate engages the portions 98c, the entire band moves downwardly together with the gate, until it engages the lower end of the body space. Thereafter continued movement of the gate to full closed position causes the portion 98b to be sprung to a larger diameter, corresponding to that of the gate.

With the construction described above and shown in FIGURE 1, it will be evident that the lower part of the body space is protected against entrance of foreign material separating out from the line fluid, for full open position of the gate or while the gate is being moved between closed and full open positions. For full open position of the gate, the guard means forms a wall extending between the valve working surfaces 42 and thus not only prevents entrance of foreign material into the lower parts of the body space, but in addition provides better flow characteristics by forming a flow stream defining wall.

As shown in FIGURE 3, the metal band 101 is provided with outwardly turned edges 102, for engaging the adjacent valve working surfaces of the body. The guard shown in FIGURE 4 consists of a band-like body 103 formed of synthetic rubber or like elastomer, reinforced by a metal endless strip 104. The edges of the rubber band may press and wipe across the valve working surfaces 42.

In the construction illustrated in FIGURE 2, the guard band 106 does not provide the portions 98b and 98c of FIGURE 1, but is a simple endless loop. When assembled within the valve, it may be sprung to fit the body space, and for full open position of the gate, it assumes the position shown in FIGURE 2. The dimensioning is such that for this position, the lower portion 106b of this band is slightly below the lower edge of the flow passages 11. With the construction of FIGURE 2, the guard band is moved to its guarding or out of the way position in response to movement of the gate between its limiting positions. When the valve gate is moved toward closed position, the first part of such movement does not change the position of the guard. However, further downward movement causes the lower end of the gate to contact the band portion 106b, and continued movement carries the band downwardly, until the gate is fully closed.

I claim:

1. In a valve construction, a body comprising side walls having openings therein forming flow passages and a closed space which is interposed between the passages, a valve gate disposed within such space and movable between open and closed positions relative to the passages, the inner surfaces of said side walls defining substantially parallel surfaces, and guard means within said body space movable in response to movement of the gate and comprising an endless band having a width to extend substantially between said parallel surfaces, and being disposed to be engaged by said gate when the gate is moved between full open and closed position, said guard means for full open position of the valve being in a position in which it embraces a substantial portion of the fluid flow and for closed position of the gate being positioned between the gate and the adjacent end portion of the body.

2. A valve as in claim 1 in which said endless band is flexible and is in the form of an endless loop extending about the gate within said body space, said band being moved between guarding and out of the way positions responsive to movement of the valve gate between full open and closed positions.

3. A valve as in claim 2 in which the band is in frictional engagement with the body and has a length greater than the perimeter of the gate and less than the perimeter of the body space.

References Cited in the file of this patent

UNITED STATES PATENTS

| | | |
|---|---|---|
| 1,257,020 | Patterson | Feb. 19, 1918 |
| 2,656,143 | Fantz | Oct. 20, 1953 |
| 2,660,191 | Volpin | Nov. 24, 1953 |
| 2,683,581 | Rovang | July 13, 1954 |
| 2,737,365 | Taylor | Mar. 6, 1956 |
| 2,824,715 | Williams | Feb. 25, 1958 |
| 2,869,574 | Volpin | Jan. 20, 1959 |
| 2,870,987 | Greenwood | Jan. 27, 1959 |
| 2,904,306 | Bryant | Sept. 15, 1959 |
| 2,911,188 | Anderson | Nov. 3, 1959 |
| 2,957,492 | Volpin | Oct. 25, 1960 |

FOREIGN PATENTS

| | | |
|---|---|---|
| 471,417 | Great Britain | Feb. 18, 1936 |
| 495,912 | Belgium | June 15, 1950 |
| 508,384 | Belgium | Jan. 31, 1952 |
| 758,693 | Germany | July 13, 1953 |
| 1,053,141 | France | Sept. 30, 1953 |